United States Patent

[11] 3,631,845

[72] Inventors Brooks Walker;
  Fred V. Hall, both of 1280 Columbus
  Avenue, San Francisco, Calif. 94133
[21] Appl. No. 871,428
[22] Filed Sept. 26, 1969
[45] Patented Jan. 4, 1972
  Continuation-in-part of application Ser. No.
  630,882, Apr. 14, 1967, now abandoned.
  This application Sept. 26, 1969, Ser. No.
  871,428

[54] SPARK TIMING CONTROL FOR INTERNAL-COMBUSTION ENGINE
  8 Claims, 8 Drawing Figs.
[52] U.S. Cl..................................... 123/117 A,
  123/97 B
[51] Int. Cl..................................... F02p 5/04
[50] Field of Search........................... 123/97 B,
  117 A, 117

[56] References Cited
  UNITED STATES PATENTS
  2,809,619  10/1957  Norris ........................ 123/117 A
  2,809,620  10/1957  Boylan ....................... 123/117 A
  3,057,938  10/1962  Perry ......................... 123/117 A X
  3,204,620  9/1965   Walker ....................... 123/102
  3,301,242  1/1967   Candelise .................... 123/117 A
  3,400,698  9/1968   Kelly ......................... 123/117 A
  3,447,518  6/1969   Walker ....................... 123/117 A
  3,479,998  11/1969  Walker ....................... 123/117 A
  3,515,105  6/1970   Soeters ...................... 123/117 A Primary Examiner—Wendell E. Burns
Attorney—Everett G. Clements ABSTRACT: This invention pertains to an automatic disconnect of the engine operated spark advance until the engine water jacket temperature has reached a predetermined temperature to reduce smog producing emissions and heat up the engine more rapidly. An engine water temperature responsive valve connects closed throttle valve suction, from the manifold to a spark control actuator to retard the spark timing when the water is below the predetermined temperature and connects closed throttle valve suction, when the engine jacket water temperature is above the predetermined temperature to the actuator to advance the spark timing.

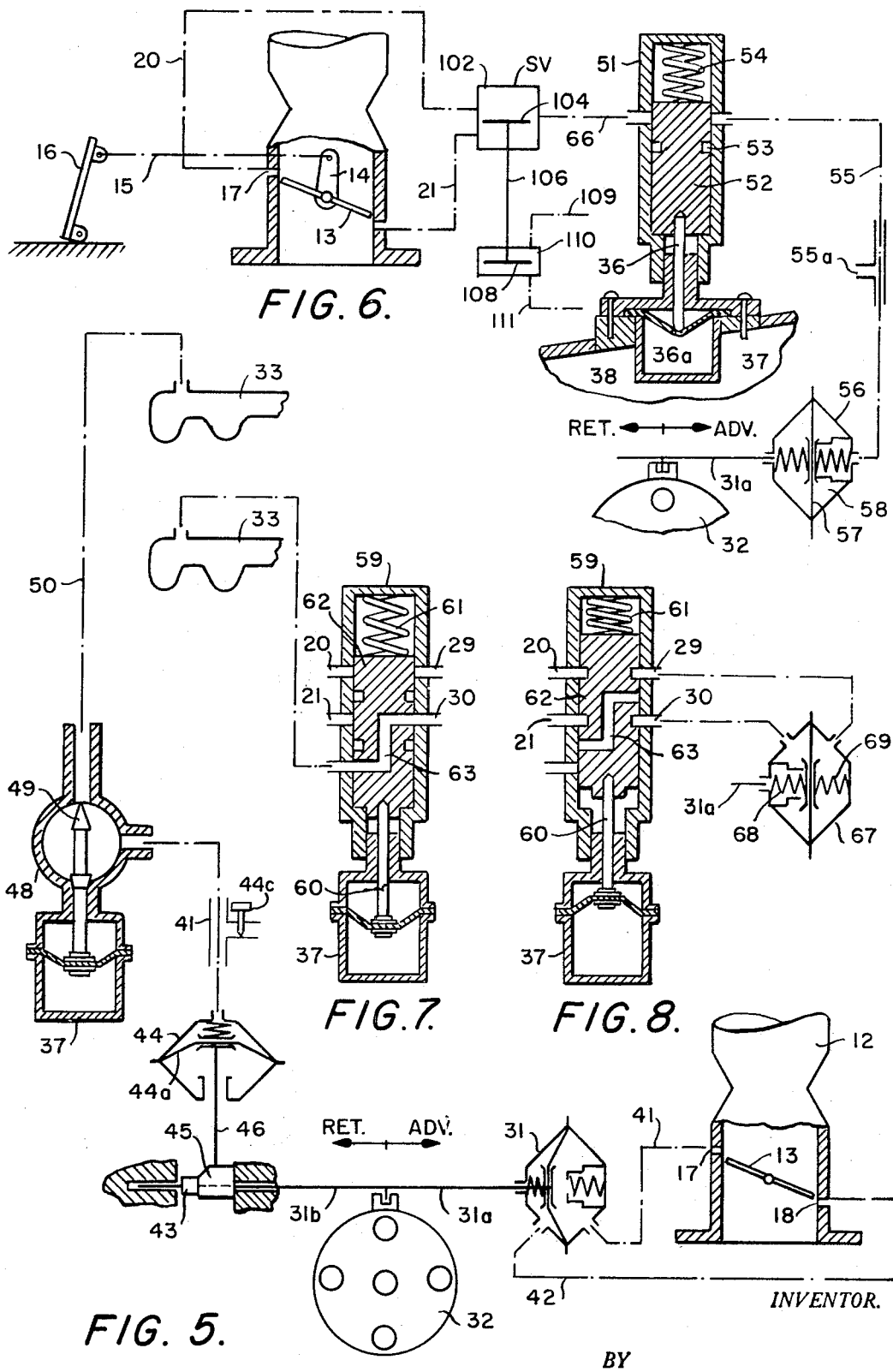

SPARK TIMING CONTROL FOR INTERNAL-COMBUSTION ENGINE

This application is a continuation-in-part of my application, Ser. No. 630,882, filed Apr. 14, 1967, now abandoned.

This invention relates to the control of the spark timing of an internal-combustion engine during warmups. More specifically it retards the spark timing during some cycles of driving or parts of driving cycles and then returning the spark timing to normal to improve combustion efficiency to reduce unburned pollutants in the exhaust from a spark ignition internal-combustion engine.

Walker application entitled "THERMAL SPARK RETARD," Ser. No. 503,035 filed Oct. 23, 1965, now abandoned shows a carburetor choke actuated vacuum advance bleed at near full choke, for limited relative retard during a limited portion of engine warm up.

A major source of atmospheric air pollution is the exhaust from internal-combustion engines, particularly automobiles. To reduce this problem two general approaches have been made, namely: (1) exhaust treating devices (e.g. catalytic mufflers, afterburners, etc.) and (2) engine modification to improve combustion.

The present invention concerns itself with engine modification which improve combustion efficiency. In particular it has been shown that relative "retarded" (from normal) spark timing improves combustion efficiency; however, it is not simply a matter of retarding the spark timing because retarded spark adversely affects engine power and economy if it is not properly applied. A relatively retarded spark timing improves combustion efficiency, but reduces thermal efficiency. It results in higher exhaust temperatures, higher water jacket temperatures, and can cause engine overheating if continued on all driving conditions if not properly controlled. Another reason for the improved combustion efficiency is the fact that larger throttle openings must be used for the same power settings such as idle which result in higher compression pressures in the engine as during idle with a relative retarded spark timing. All of these factors improve combustion efficiency of the engine during such driving cycles which in turn reduces the amount of unburned constituents in the exhaust. The primary pollutants with which we are presently concerned are unburned hydrocarbon and carbon monoxide with unburned hydrocarbons being the most important. To control carbon monoxide it is generally only necessary to lean the mixture ratio; however, with unburned hydrocarbons the problem is entirely different. Even with lean mixture ratios excessive unburned hydrocarbon can result due to quenching effects in the engine, particularly because in some engines quench areas in the combustion chamber are incorporated in the design to reduce octane requirement (tendency to knock or detonate) or in order to obtain higher engine power.

In addition during warmups excessively rich mixtures are used and the "vacuum" or intake suction controlled spark advance mechanism usually employed is in the advance position because the fast idle cam holds the throttle slightly open when the carburetor is choked, allowing the engine suction from the "vacuum spark advance" port in the carburetor to be communicated to the spark advance diaphragm, as the edge of the throttle blade will move to place such port on the engine side of the throttle when on the high cam while in normal idle position the port is on the upstream side of the throttle blade. As advanced spark aggravates the problem in addition to the rich mixtures used during warmup, proper spark timing control will effectively reduce emission of unburned exhaust constituents. Also of great importance is the fact that faster warmups will be obtained due to this control and to the greater heat rejection to the water jacket at relative retarded spark settings.

An object of the present invention is the use of a temperature sensor other than that used to choke the engine so that the relative spark retard at warmup may last longer than the automatic choke operation of the carburetor.

Another object of the invention is the use of engine developed suction to operate the relative retard so that if full engine power is needed, such as passing, hill climbing, etc., the spark will be normal for such power as at full or near full throttle. There is not enough engine developed suction to operate the relative retard and the engine will operate with normal full power spark retard.

Another object of the present invention is the use of a temperature sensor to switch from a "vacuum advance" of the engine spark to a suction operated retard of the spark during warmup.

Another feature of the invention is to have the temperature sensor introduce a mechanical stop or section limiter in the engine suction operated mechanism to limit the engine suction operated spark advance or retard mechanism to a preselected portion of the suction operated spark advance or advance and retard range during engine warmup.

Another feature is the use of a temperature sensor in the engine water jacket to sense the engine temperature, whereas the choke thermostat is generally in the exhaust as the spark relative retard will be on for longer than the carburetor choke.

Another feature of the invention is the use of a wax in a metal container as the temperature sensor as that has enough power to move a valve without other power multipliers, such as an auxiliary suction operated motor, electric solenoid, etc.

Another object of the invention is the use of a valve in combination with a high port just above the throttle blade on a down draft carburetor, a port to manifold suction and a port to just below the low edge of the throttle blade so that with said valve, when the engine is warm, the high port will give no vacuum advance and the low port will give a suction operated retard below no suction operated advance when at idle. The valve will or can give high port actuated suction retard when the engine is cold.

Another feature of the invention is the use of a temperature actuated valve to operate a motor to introduce a stop to limit the action of an engine suction operated spark advance or advance and retard mechanism.

Another feature is the use of a temperature sensor different from the choke actuating thermostat for the different timing of the warmup relative spark retard compared to the timing of the choke "on" during warmup.

Other features of the invention will be more particularly pointed out in the accompanying specification and claims.

IN THE DRAWINGS:

FIG. 5 is a elevation drawing partly in section and partly schematic showing FIG. 4 of the invention in the cold engine position.

FIG. 6 is a drawing in elevation, partly in section and partly schematic, of an alternate embodiment of the invention;

FIGS. 7 and 8 present a drawing partly in section and partly schematic of an alternate construction of the invention.

Figure 1:
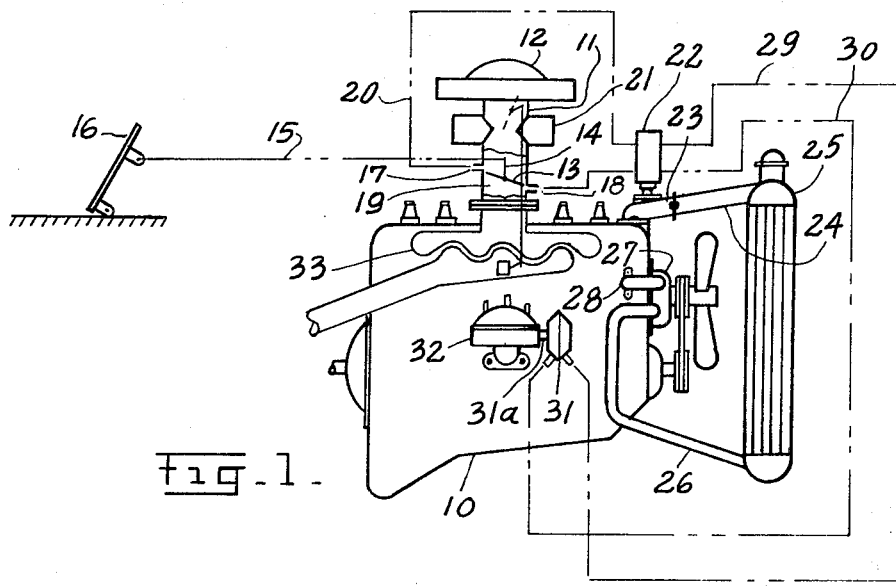
FIG. 1 is a drawing in elevation, and partly schematic, of an engine equipped with an embodiment of the present invention for controlling the spark timing during warmup.

In all figures like numerals of reference refer to corresponding parts. We have illustrated our invention in the accompanying three sheets of drawings, in which:

FIG. 1 shows an automative spark ignition engine 10 and pertinent portions of a system concerned with the present invention. Engine 10 is equipped with carburetor 11 which is provided with air cleaner 12, throttle butterfly 13, bellcrank 14 and control rod 15. Control rod 15 is connected at the right end to bellcrank 14 and at left end to accelerator pedal 16. Carburetor 11 is equipped with a high port 17 sometimes called a vacuum advance port and a low port 18 which are in communication with the throat 19 of carburetor 11 and close to the high and low edge respectively of the throttle blade. Tube 20 shown as a dotted line leads from high port 17 and tube 21 leads from low port to a thermal controlled valve 22. Valve 22 is connected to water outlet fitting 23 at the lower end. The water temperature-sensing thermostat may be near the radiator not shown. Water outlet fitting 23 is part of the cooling system of engine 10 which comprises a hot water return tube 24, radiator 25, cooler water return tube 26, water pump 27 and engine inlet tube 28 which connects to engine 10 at its left end. Tubes 29 and 30 lead from valve 22 to vacuum or engine developed suction operated spark control diaphragm 31. Where vacuum is used herein it is understood to include engine developed suction, such as intake suction. Vacuum operated spark control actuator 31 is connected to distributor 32. Such connection may rotate the distributor or the breaker plate so that when rod 31a moves to the right, as viewed in FIG. 1, the engine spark will be advanced. A governor advance may be used to advance the cam in the usual manner, but not shown. Intake manifold 33 is attached to engine 10 and to carburetor 11 to transmit a combustible mixture of fuel and air to said engine as controlled by the carburetor throttle. A choke valve c may be used and actuated by an exhaust heated thermostat T if desired.

Figure 2:
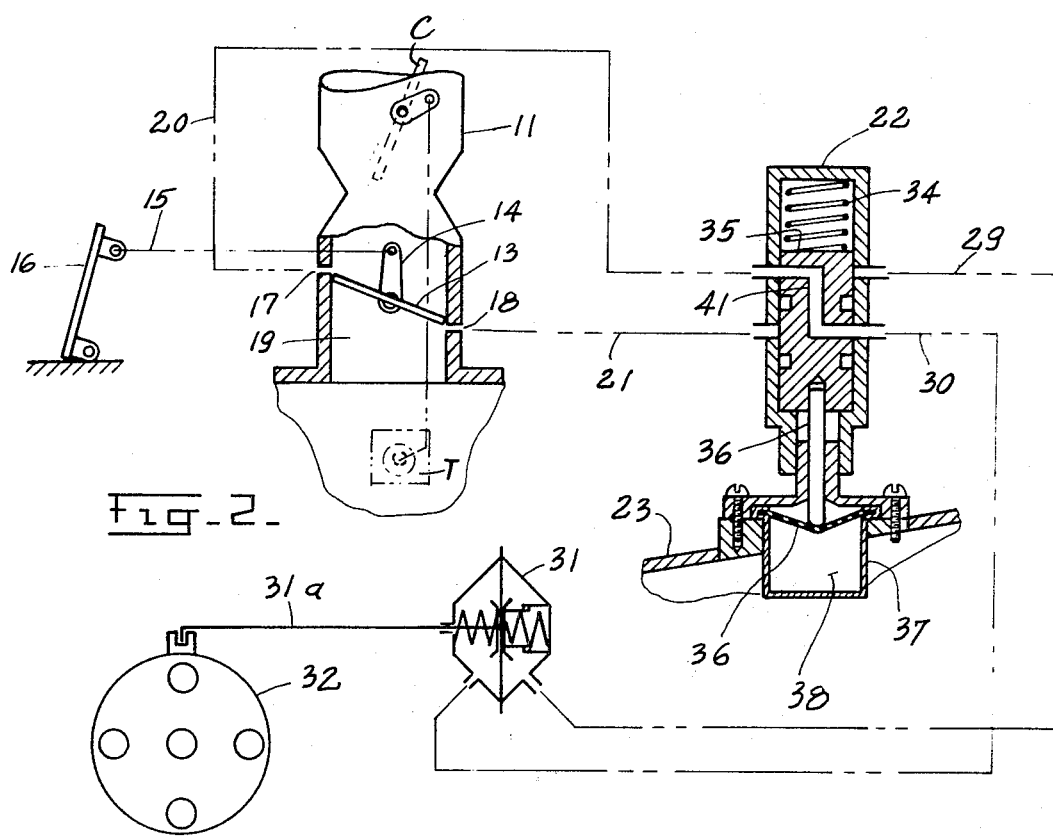
FIG. 2 is a drawing in elevation, partly in section partly schematic, showing the pertinent components of the present invention shown in FIG. 1.

In FIG. 2 valve 22 includes spring 34 which urges spool valve 35 downward. Rod 36 is attached at its upper end to spool valve 35 and rests against diaphragm 36a at its lower end. Thermal control actuator 37 is attached at its upper end to valve 22 and elbow 23. Cavity 38 of thermal control actuator 37 is filled with wax of other suitable material having large volume changing properties with temperature changes.

Figures 3, 4:
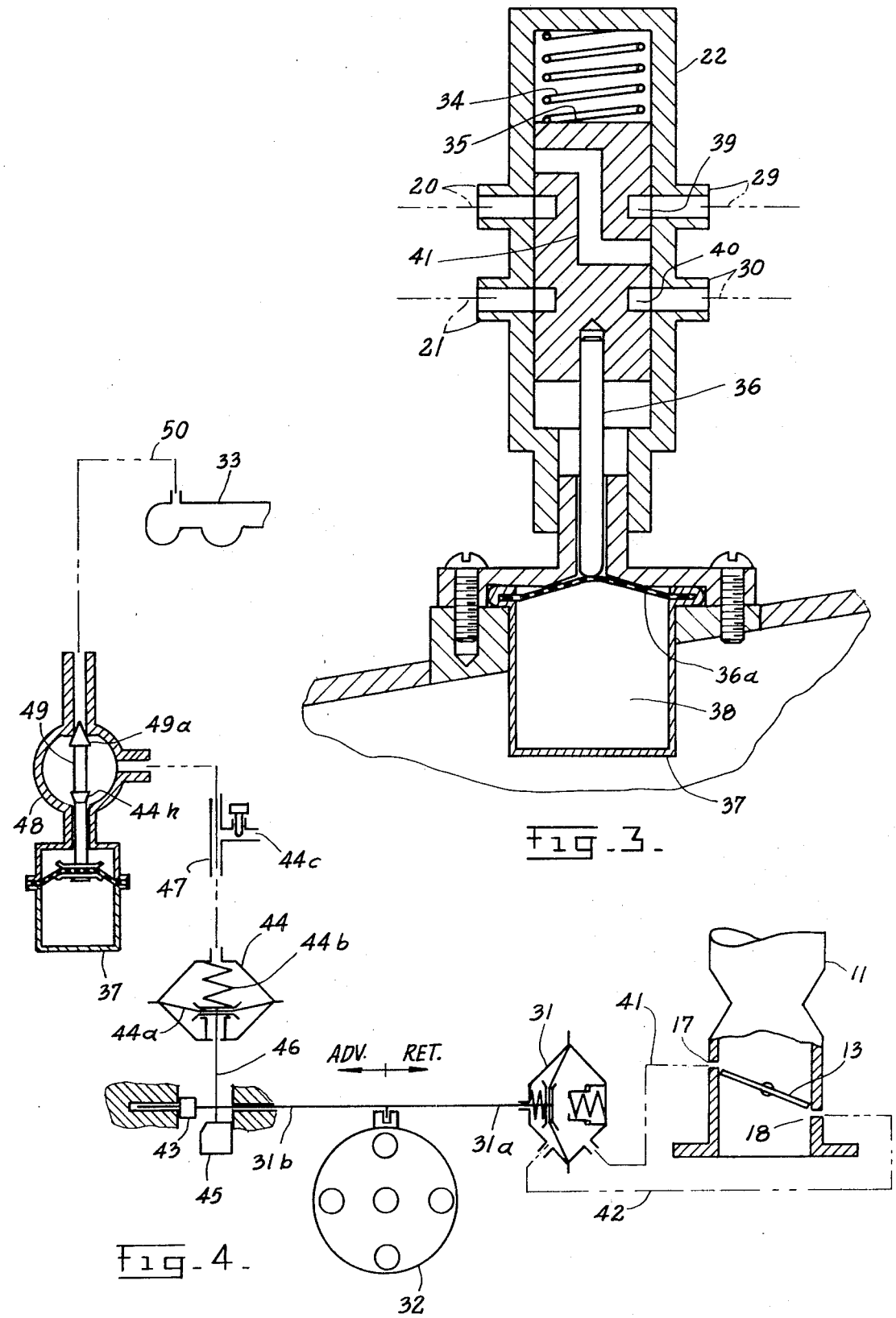
FIG. 3 is an enlarged view in section of the thermal control valve as used in FIGS. 1 and 2 shown in its hot engine position.
FIG. 4 is an elevation partly in section and partly schematic showing an alternate embodiment of the invention in the hot engine position.

In FIG. 3 we have shown a different type of valve 22. Groove 39 connects tube 20 to tube 29 and groove 40 connects tube 21 to tube 30. Connecting hole 41 in spool valve 35 lead from the upper left side of spool valve 35 to the right center of spool valve 35 and is shown in the closed position. Diaphragm 36a is shown in the extended position being forced upward by the heated (melted) wax 38 in thermal control actuator 37. A condition that exists when the engine is warm or hot.

In FIG. 4 a schematic of an alternate means is shown. Tubes 41 and 42 lead from the high port 17 and low port 18 respectively of carburetor 11 to vacuum spark control actuator 31 which includes a vacuum advance side and a vacuum retard side. The motion of said actuator 31 is transmitted to distributor 32, (or breaker plate in distributor 32), by rod 31a. Rod 31b is an extension of rod 31a and carries stop 43 at its left end. Vacuum operated stop actuator 44 carries cam wedge 45 at the lower end of rod 46. Diaphragm 44a is urged downward by the action of spring 44b. Tube 47 carries bleed orifice 44c and leads from actuator 44 to valve 48 which is shown in its warm or hot engine position with valve stem 49 being forced upward by thermal control actuator 37 so that valve 49a closes off flow from tube 50 and intake manifold 33, bleed 44c or leakage past stem 49 will allow diaphragm 44a to move down by spring 44b to move cam stop 45 out of contact with stop 43.

If leakage past stem 49 is possibly enough bleed, bleed 44c may not be needed. Valve 44b may close off leakage past stem 49 when down.

FIG. 5 is similar to FIG. 4 except that valve 48 is shown in the cold engine position with cam stop 45 in contact with stop 43 to limit the action of the vacuum advance or vacuum advance and retard mechanism to the desired spark retard.

In FIG. 6 tube 20 connects high port 17 to the thermal controlled valve 51 through speed-sensing valve SV and tube 21 connects low port 18 to speed sensor valve SV which leads to spool valve 52 which is provided with groove 53 and is urged downward by spring 54. Rod 36 is attached to spool valve 52 at its upper end and contacts diaphragm 36a at its lower end. Diaphragm 36a is shown in its relaxed or cold engine position being held in position by the cold (frozen wax) in thermal actuator 37. Tube 55 leads from thermal control valve 51 to vacuum spark advance mechanism 56 and is provided with bleed orifice 55a when leakage past piston 52 or a groove therein is not enough. Diaphragm 57 is urged to the left by the action of spring 58.

OPERATION

Referring now to FIGS. 1 and 2 and assuming engine 10 is installed in an automobile (not shown) and that the engine 10 is started up cold, e.g. after standing all night in the garage, said engine would be below 65° F., as an example, and the water in radiator 25 and engine 10 would be at a similar cold temperature. Water in said engine would contact thermal actuator 37 which conducts heat to or from said thermal actuator and initially wax 38 in said thermal actuator would be solid (frozen) as shown in FIG. 2. In this condition wax 38 occupies minimum volume as it is characteristic for wax to shrink in volume considerably when frozen as compared to the volume when in the liquid or melted condition. At minimum volume for wax 38, spring 34 of thermal actuator 22 forces spool valve 35 to its farthest downward position, as shown in FIG. 2. In this position connecting hole 41 is in open communication with tube 20 and tube 30. As under cold conditions the throttle butterfly is held to the slightly open or "cracked" position by the fast idle cam of the usual automatic choke (not shown), so that the high port would be exposed to manifold suction as the edge of butterfly 13 would be above port 17, as shown in FIG. 2. Therefore, engine manifold suction or vacuum would be communicated by tubes 20 and 30 to vacuum spark relative advance or retard actuator 31 to move distributor 32 or breaker plate in distributor 32 to the no vacuum advance retard position relative to normal idle spark advance. At any throttle position above the fast cam (not shown) position high port 17 is still communicating intake suction or vacuum to tube 20. The spark is held in the vacuum actuated relative retard position by spark control actuator 31 acting on the distributor side of actuator 31.

As the engine or automobile is driven, the engine temperature rises and heat is transferred to the water in engine 10 which in turn circulates to water outlet fitting 23 of engine 10 under the action of pump 23. Said water is in contact with thermal actuator 37 and heat is transferred to wax 38 in said thermal actuator 37. Said wax 38 has or may have a melting point of 160° F. or somewhat higher or lower. As the water temperature reaches 160° F. wax 38 in thermal actuator 37 melts. As there is a relatively large increase in the volume of wax 38 in its melted condition, it forces spool valve 35 to its farthest upward position (FIG. 3) by means of rod 36, overcoming the compression of spring 34. In this position grooves 39 and 40 of spool valve 35 line up with tubes 20 and 29 and 21 and 40 of respectively allowing free communication from high port 17 by tube 20 to vacuum advance line 29 and from low port 18 by tube 21 to vacuum retard line 30. In addition, fast idle came of the automatic choke (not shown) now allows throttle butterfly 13 to return at idle position below high port 17 when idling at its farthest closed position for normal idle. Under this condition high port 17 is above throttle butterfly 13 and low port 18 is throttle butterfly 13 to provide no vacuum advance suction operated relative retard for idle which is desirable with a warm or hot engine.

Now consider that the operator pushes accelerator pedal 16 downward to start the car in motion. Rod 15 opens throttle butterfly 13 by means of rod 15 and bellcrank 14. In this condition where throttle butterfly is in a position where the high port is active (communicates vacuum), vacuum is communicated by tube 20, valve 22, tube 29 to spark control actuator 31 which rotates distributor 32 clockwise to the vacuum advance position. Thus the spark timing with the engine cold is in the retard position under all operating conditions, except for the relative governor spark advance and with the engine hot the spark is at vacuum retarded position at hot idle but is in normal vacuum advance (and governor advance, not shown) for other operating conditions where the throttle is opened. At wide open there is normally only the governor advance and not enough suction for vacuum advance.

Now referring to FIGS. 4 and 5 in which an alternate embodiment of the present invention is shown, and assuming the engine is hot, thermal control valve 49a is in its closed position with the bleed along stem 49 or bleed 44c open. This allows diaphragm 44a to be forced downward by spring 44b which in turn moves cam wedge 45 to its lowest position by means of rod 46. In this position stop 43 is free to move to its full right or full left position, as defined by the crosshatched segments, for full vacuum advance or vacuum retard action. Spark control is then identical to that previously described in connection with the operation of FIGS. 1 and 3 for the hot condition being vacuum advance controlled by high port 17 and vacuum retard by low port 18 namely vacuum retard at idle and vacuum advance in a normal manner for any other conditions where the throttle butterfly 13 is opened.

At cold operating configurations, as shown in FIG. 5, the wax 38 (FIGS. 2 and 3) in thermal actuator 37 (FIG. 5) is frozen (solid) somewhere under 160° F. and plug 49 of thermal control valve 48 is in its lowest position and allows vacuum to be communicated from intake manifold 33 to stop vacuum operated actuator 44, said vacuum actuator on diaphragm 44a overcoming the compression of spring 44b and moving cam wedge 45 to its farthest upward position (FIG. 5). In this position and with the desired dimensions of cam wedge 45, the cam wedge limits the amount of travel or the vacuum advance (or vacuum advance, and vacuum retard if a device like that shown in FIGS. 1 and 2 is used). This limits the spark advance or retard control range which actuator 31 can impart to distributor 32 to something less than full vacuum advance action or less than full vacuum controlled advance and retard range.

In FIG. 6 we have shown an alternate embodiment of the present invention using high port vacuum for vacuum advance control at idle, or no vacuum advance at idle, and a speed sensor valve SV to switch intake suction through tube 21 at operations above a predetermined engine speed for full vacuum advance at cruises and decelerations which is desirable for smog control on some engines.

With the engine cold, thermal actuator 37 allows spring 54 to force spool valve 52 to its lowest (closed) position. In this position spring 58 urges diaphragm 57 to its farthest left position and rod 31a forces distributor 32 clockwise to its no vacuum advance position with the engine below a desired temperature. Bleed orifice 55a or leakage past valve 52 bleeds off any vacuum suction holding diaphragm 57. With the engine hot, thermal actuator 37 forces spool valve 52 to its farthest upward position where groove 53 is in communication to high port 17 by means of tube 20 or manifold suction as controlled by speed-sensing valve SV. Under this condition vacuum advance is normal on all cruises and at full power and fuel decelerations for lower emissions at decelerations.

FIGS. 7 and 8 show an alternate construction of the valve 22 of FIG. 2 and show a valve 59. With the engine operating in the cold condition, thermal actuator 37 acts by means of rod 60 and spring 61 to urge spool valve 62 to its lowest position, as shown in FIG. 7, with manifold suction going to vacuum retard port 30 and vacuum retard side 68 of actuator 67. When hot, high port 17 is connected to line 20, line 29 to vacuum advance side 69 of actuator and low port 18 is connected to line 21, line 30 and to vacuum retard side 68 of actuator 67 to give no vacuum advance and vacuum controlled relative retard when cold and the same when hot at idle, but normal vacuum advance at cruises and power when the engine is hot.

The speed sensor valve comprises a housing 102 having a piston 104 reciprocably mounted therein to connect either tube 20 or 21 to tube 66. The piston 104 is connected by a rod 106 to a piston 108 reciprocably mounted in a housing 110. A pair of conduits 109 and 111 connect opposite ends of housing 110 to a speed responsive device such as disclosed in the U.S. Pat. No. 3,204,620 to Walker. Piston 108 is centered by opposed springs (not shown) as in said Walker patent.

Many of the modifications shown in some of these figures can be used in others if different results are desired at hot drive spark control.

We have illustrated our invention in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

We claim:

1. In an engine having a liquid cooling system, a carburetor attached to an intake manifold providing suction, a throttle for the carburetor and a spark ignition system,
a suction operated spark advance first mechanism,
a suction operated spark retard second mechanism
said engine having a first suction port just upstream from the higher edge of said throttle and a second suction port just below the lower opposite side edge of said throttle when the latter is in engine idle position,
a temperature-sensing device for the cooling liquid,
means for connecting each port with a mechanism,
said connecting means being operative in response to the temperature-sensing device, when the liquid is above a predetermined temperature, to control said mechanisms to provide full suction operated spark retard and no suction operated spark advance at engine idle throttle position to control said mechanisms for differential operation to produce full suction operation spark advance when the throttle is advanced from said engine idle position for power operation at substantially less than full power operation,
said connecting means being operative in response to the temperature-sensing device when the liquid is below the predetermined temperature to control said mechanisms to provide some suction operated spark retard and not suction operated spark advance at part throttle operation where enough suction is available to operate said first or second mechanism.

2. In an engine as defined by claim 1, in which the connecting means comprises a valve controlled by the temperature-sensing device for cutting off suction flow to the first mechanism while allowing flow of suction in the duct between the first suction portion and the second mechanism when the liquid is below the predetermined temperature and the engine is operating at part open throttle.

3. In an engine as defined by claim 2 in which said valve is operative to connect the first mechanism with the first suction port and the second mechanism with the second suction port when the cooling liquid is above the predetermined temperature.

4. In an engine as defined by claim 1 in which the spark advance and retard is controlled by a common member movable in opposite directions by the mechanism respectively, the temperature responsive means including a stop movable into the path of the common member when the cooling liquid is below the predetermined temperature, to stop movement of the member in a direction to advance the spark by the first mechanism and also stop some of the motion of said second device to effect at least some suction operated spark retard, said stop being movable out of said path when the cooling liquid is above said predetermined temperature said stop controlling the action of the common member to effect no suction controlled spark advance and some vacuum controlled spark retard when said stop is effective.

5. In an engine as defined by claim 4 in which the temperature responsive means further includes a suction motor for moving the stop, a duct connecting the motor to the manifold, a valve, and a device for operating the valve to block or clear the duct in dependence on whether the cooling liquid is above or below the predetermined temperature.

6. A spark timing control for an internal-combustion engine having a liquid cooling system, an inlet manifold for conducting fuel to the engine, and a carburetor having a throat and a throttle valve movable in said throat between a closed and an open position for controlling fluid flow through the throat, a pair of ports extending through the throat wall, a first port being downstream of the valve and the second port being upstream of the valve when in the engine idle position, comprising a first suction operated motor for advancing the spark timing within a range and a second suction operated motor for retarding the timing of the spark within a range, a duct connecting the first port with the first motor, a duct connecting the second port with the second motor, and means responsive to the cooling liquid temperature when it is below a predetermined temperature, for controlling the operations of the motors by blocking operation of the first suction motor and limiting the operation of the second suction motor to limit the range of spark retard while said cooling liquid is below a selected temperature.

7. A spark timing control as defined in claim 6 wherein the control means includes a member movable by both motors in respectively opposite directions to advance and retard the timing of the spark and a shiftable stop movable into the path of movement of the member.

8. A spark timing control as defined in claim 7 further including a further suction operated motor for shifting the stop, means including a shiftable valve for connecting the further suction operated motor with a suction source provided by the engine.

* * * * *